Patented Apr. 8, 1952

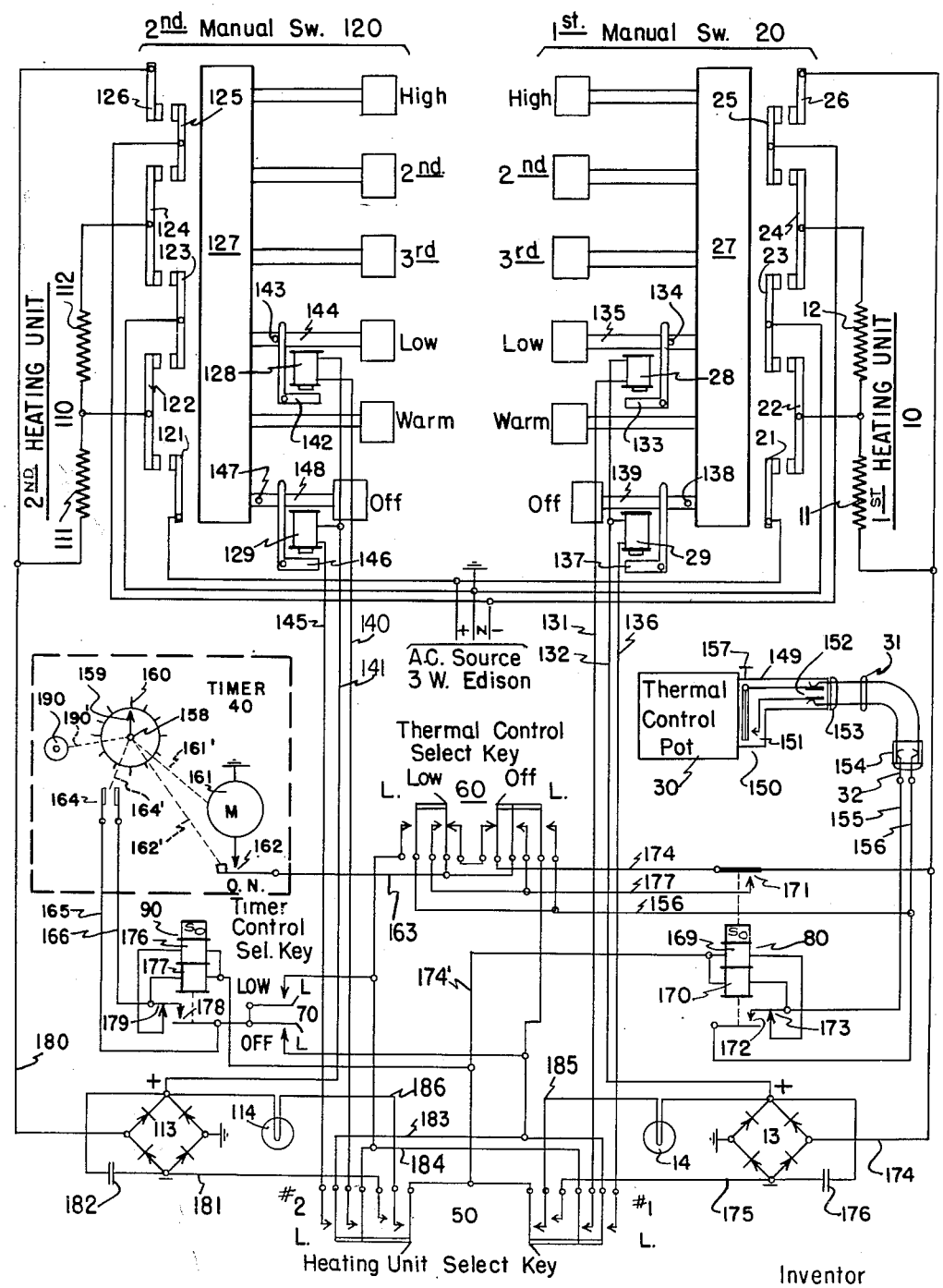

2,591,849

UNITED STATES PATENT OFFICE 2,591,849

HEATING CIRCUIT CONTROL FOR ELECTRIC APPLIANCES

Walter R. McDowell, Western Springs, Ill., assignor to Hotpoint Inc., a corporation of New York Application December 31, 1949, Serial No. 136,365

16 Claims. (Cl. 219—20)

The present invention relates to heating circuit controls for electric appliances, and more particularly to improved circuit controls for electric ranges of the type disclosed in the copending application of Walter R. McDowell, Serial No. 56,813, filed October 27, 1948, now Patent No. 2,550,579, granted on April 24, 1951.

In the McDowell application mentioned there is disclosed an electric range provided with a cooking top carrying a surface heating unit and a backsplasher carrying a manually operable control switch of the push button multiposition type for selectively setting the heating circuit connections between the heating unit and an associated source of alternating current of the three-wire Edison type. Also, this electric range comprises a cooking vessel carrying a thermal responsive device operative in response to a predetermined cooking condition in the vessel, an electro-responsive motor or relay operatively connected to the low push button of the control switch, and an operating circuit for the motor including the device.

In the operation of this electric range the high push button of the control switch is first manually operated to effect operation of the control switch from its off position into its high position, and the vessel and its contents are placed upon the surface heating unit, whereby the vessel and its contents are heated at the high rate. Also, operation of the control switch into its high position prepares the operating circuit for the motor; and when a cooking temperature is reached by the contents of the vessel, the thermal responsive device is operated automatically to close the operating circuit of the motor so as to effect operation thereof. Upon operating, the motor operates the low push button of the control switch in order to effect operation of the control switch from its high position into its low position, whereby the vessel and its contents are further heated at the low rate. Also, operation of the control switch into its low position opens the operating circuit for the motor. The operation of the control switch from its high position into its low position in response to operation of the thermal responsive device prevents vigorous boiling of the contents of the vessel and assures continued cooking thereof at the low rate. Also, the control switch embodies an indicating arrangement for selectively illuminating the different operated ones of the push buttons thereof in corresponding colors, thereby to provide a color controlled indicator of the switching position of the control switch.

While this heating control circuit arrangement is entirely satisfactory in operation, it provides facilities for selectively operating the control switch only upon the thermal basis noted; whereas, it has been found highly desirable to provide facility for operating the control switch also upon a time basis. In fact, it has been found most desirable to operate the control switch alternatively upon the thermal basis or upon a time basis under certain cooking conditions; and finally it has been found highly advantageous to operate the control switch sequentially first upon the thermal basis and then upon the time basis. Moreover, the arrangement of the McDowell application noted provides facility for operating only the control switch associated with a particular one of the surface heating units, thereby limiting the general application of the arrangement to the utilization of this particular surface heating unit. In practice it has been found highly desirable to render this control facility suitably flexible so that it may be employed alternatively in conjunction with two of the surface heating units.

Accordingly, it is a general object of the present invention to provide in an electric heating appliance, such, for example, as an electric range, a heating control circuit arrangement that may be selectively or alternatively controlled either upon a thermal basis or upon a time basis.

Another object of the invention is to provide in an electric heating appliance, such, for example, as an electric range, a heating control circuit arrangement that may be selectively controlled sequentially first upon a thermal basis and then upon a time basis.

A further object of the invention is to provide in an electric heating appliance, such, for example, as an electric range, a heating control circuit arrangement that may be selectively operatively associated with any one of a plurality of heating units incorporated in the range.

A still further object of the invention is to provide in an electric heating appliance, an improved heating control circuit lending flexibility and ease of operation to the appliance.

Further features of the invention pertain to the particular arrangement of the elements of the electric heating appliance and of the control circuit incorporated therein, whereby the above-outlined and additional operating features thereof are attained.

The invention, both as to its organization and method of operation, together with further objects and advantages thereof, will best be understood by reference to the following specification taken in connection with the accompanying drawing, in which the single figure is a diagrammatic illustration of the heating and control circuits and facilities incorporated in an electric range and embodying the present invention.

Referring now to the drawing, there is illustrated the heating control circuit for an electric range and embodying the features of the present invention. The electric range, not shown, comprises the usual cooking top provided with a pedestal adjacent to the rear thereof that supports the usual upstanding hollow backsplasher; all disclosed in the previously mentioned McDowell application. The control circuit comprises a plurality of surface heating units, including the first surface heating unit 10 and the second surface heating unit 110. The surface heating units 10 and 110 are disposed adjacent to the rear of the cooking top forwardly of the pedestal and the supported backsplasher, and preferably comprise the respective left rear and right rear surface heating units of the electric range. Preferably each of the heating units 10 and 110 is of the usual sheathed resistance conductor type comprising two sections. Specifically, the heating unit 10 comprises the series related sections 11 and 12, and the heating unit 110 comprises the series related sections 111 and 112.

Also, the control circuit comprises a plurality of manually operable control switches of the push button type, including the first control switch 20 and the second control switch 120. Preferably the control switches 20 and 120 are of the basic construction of that disclosed in U. S. Patent No. 2,431,904, granted on December 2, 1947 to John L. Andrews, and embody the color indicator arrangement disclosed in U. S. Patent No. 2,437,555, granted on March 9, 1948 to Gregory L. Rees. Each of the control switches comprises six individual switching positions and six corresponding push buttons, the switching positions and push buttons including high, second, third, low, warm and off. Specifically, the control switch 20 comprises the six switching contacts 21, 22, 23, 24, 25 and 26 that are selectively operated into the six switching positions noted by associated transfer and interlock mechanism 27 that is selectively operated by the associated six push buttons. Likewise, the control switch 120 comprises the six switching contacts 121, 122, 123, 124, 125 and 126 that are selectively operated into the six switching positions noted by associated transfer and interlock mechanism 127 that is selectively operated by the associated six push buttons.

Also, the control circuit comprises an alternating current source of the three-wire Edison type including a "+" line conductor, a neutral or "N" conductor and a "—" line conductor, the "N" conductor being grounded in the electric range, and a potential of 230 volts being present between the "+" and the "—" conductors, thereby providing a voltage of 115 volts between the "N" conductor and either of the other line conductors "+" or "—". The control switches 20 and 120 are respectively individually associated with the heating units 10 and 110. Specifically, one terminal of the section 11 is connected to the switching contact 26; one terminal of the section 12 is connected to the switching contact 24; and the common terminal of the sections 11 and 12 is connected to the switching contact 22. Likewise, one terminal of the section 111 is connected to the switching contact 126; one terminal of the section 112 is connected to the switching contact 124; and the common terminal of the sections 111 and 112 is connected to the switching contact 122. The switching contacts 21, 23 and 25 are respectively connected to the "+," "N" and "—" conductors; and, likewise, the switching contacts 121, 123 and 125 are respectively connected to the "+," "N" and "—" conductors.

As disclosed in the Andrews patent mentioned, when the off push button of the control switch is operated the six switching contacts thereof are operated to interrupt all electrical connections between the source of current supply and the associated heating unit; and the previously operated one of the other push buttons is returned to its normal position by the associated transfer and interlock mechanism. Thus only one of the push buttons of the control switch may occupy an operated or in position at any time, all of the other push buttons thereof occupying their normal or out positions. Also, in the control switch, when the high push button is operated, the two sections of the associated heating unit are connected in multiple across the "+" and "—" conductors; when the second push button is operated, one of the sections of the associated heating unit is connected across the "+" and "—" conductors; when the third push button is operated, the two sections of the associated heating unit are connected in multiple across the "—" and "N" conductors; when the low push button is operated, the one section of the associated heating unit is connected across the "—" and "N" conductors; and when the warm push button is operated, the two sections or the associated heating unit are connected in series across the "—" and "N" conductors. In the above description it will be understood that the references "+" and "—" are employed only for the purpose of explanation as an alternating voltage actually appears between these line conductors. In the interest of brevity the specific operations of the control switches 20 and 120 selectively to effect the different heating connections between the source of current supply and the respective heating units 10 and 110, will not be described; however, for reference purposes the sections 11 and 111 may be termed the first sections of the respective heating units 10 and 110 and the sections 12 and 112 may be termed the second sections of the respective heating units 10 and 110 in employing the above description.

Further, the control circuit comprises a thermal control pot 30 that includes a thermal element responsive to the temperature of a wall thereof and that is preferably of the construction disclosed in the copending application of Leo F. Berg and Walter R. McDowell, Serial No. 17,248, filed on March 26, 1948, now patent No. 2,530,643, granted on November 21, 1950, and a timer 40 of conventional construction and arrangement. Also, the control circuit comprises a heating unit select key or switch 50 of the three-position type common to the heating units 10 and 110, a thermal control select key or switch 60 of the three-position type common to the control switches 20 and 120, and timer control select key or switch 70 of the three-position type common to the control switches 20 and 120. The thermal control select key 60 is employed for the purpose of transferring either a low control or an off control from the thermal control pot 30 to the control switch of a selected one of the heating units 10 or 110, as explained more fully hereinafter; while the timer control select key 70 is employed for the purpose of transferring either a low control or an off control from the timer 40 to the control switch of a selected one of the heating units 10 or 110, as explained more fully hereinafter. Of course, the heating unit select key 50 is employed for the purpose of selecting one of the heating units 10 or 110 to be controlled either by the thermal control pot 30 or by the timer 40 or by both the thermal control pot 30 and the timer 40, as explained more fully hereinafter.

The control circuit further comprises a relay 80 individual to the thermal control pot 30, and a relay 90 individual to the timer 40, the relays 80 and 90 being employed for control purposes, as explained more fully hereinafter. Also, the control circuit is provided with two rectifier bridges 13 and 113 respectively individual to the heating units 10 and 110, as well as two pilot or control lamps 14 and 114 respectively individual to the heating units 10 and 110. Further, the control circuit comprises two low electro-responsive motors 28 and 128 and two off electro-responsive motors 29 and 129, the motors 28 and 29 being also incorporated in the control switch 20, and the motors 128 and 129 being also incorporated in the control switch 120.

In the construction and arrangement of the electric range, it is contemplated that the control switches 20 and 120 will be mounted in corresponding openings provided in the upstanding hollow backsplasher, not shown, and readily manually operable from the front thereof. Also, it is contemplated that the timer 40 and the keys 50, 60 and 70 will be mounted in corresponding openings provided in the backsplasher and readily manually operable from the front thereof. The casings of the control switches 20 and 120, as well as the respectively associated motor pairs 28, 29 and 128, 129, are mounted within the hollow backsplasher and concealed from view from the front thereof. Likewise, the relays 80 and 90 and the rectifier bridges 13 and 113 are mounted within the hollow backsplasher and concealed from view from the front thereof. Further, the pilot lamps 14 and 114 are suitably mounted in corresponding openings provided in the backsplasher and respectively associated with the opposite sides of the key 50. The thermal control pot 30 may be readily and removably supported upon either one of the surface heating units 10 or 110 and is connected by an associated cable 31 of the detachable type to a receptacle 32 also mounted upon the backsplasher and accessible from the front thereof.

Consider now the construction and arrangement of certain of the elements of the control circuit in greater detail. The low motor 28 incorporated in the control switch 20 is in the form of a relay and comprises a winding the terminals of which are respectively connected to two conductors 131 and 132. Also, the low motor 28 comprises a pivotally mounted armature 133 that is operated when the winding thereof is energized and cooperates with a pin 134 carried by the push rod 135 of the associaated low push button. Thus when the winding of the low motor 28 is energized the armature 133 is operated to move the push rod 135, and consequently the low push button, through the pin 134 into its in position, whereby the control switch 20 is operated into its low position just as though the low push button thereof had been manually operated from its out position into its in position. Similarly, the off motor 29 incorporated in the control switch 20 is in the form of a relay and comprises a winding the terminals of which are respectively connected to the conductor 132 and to a conductor 136. Also, the off motor 29 comprises a pivotally mounted armature 137 that is operated when the winding thereof is energized and cooperates with a pin 138 carried by the push rod 139 of the associated off push button. Thus when the winding of the off motor 29 is energized the armature 137 is operated to move the push rod 139, and consequently the off push button, through the pin 138 into its in position, whereby the control switch 20 is operated into its off position just as though the off push button had been manually operated from its out position into its in position.

The low motor 128 incorporated in the control switch 120 is in the form of a relay and comprises a winding the terminals of which are respectively connected to two conductors 140 and 141. Also, the low motor 128 comprises a pivotally mounted armature 142 that is operated when the winding thereof is energized and cooperates with a pin 143 carried by the push rod 144 of the associated low push button. Thus when the winding of the low motor 128 is energized the armature 142 is operated to move the push rod 144, and consequently the low push button, through the pin 143 into its in position, whereby the control switch 120 is operated into its low position just as though the low push button thereof had been manually operated from its out position into its in position. Similarly, the off motor 129 incorporated in the control switch 120 is in the form of a relay and comprises a winding the terminals of which are respectively connected to the conductor 141 and to a conductor 145. Also, the off motor 129 comprises a pivotally mounted armature 146 that is operated when the winding thereof is energized and cooperates with a pin 147 carried by the push rod 148 of the associated off push button. Thus when the winding of the off motor 129 is energized the armature 146 is operated to move the push rod 148, and consequently the off push button, through the pin 147 into its in position, whereby the control switch 120 is operated into its off position just as though the off push button had been manually operated from its out position into its in position.

The thermostatic control pot 30 constitutes a cooking vessel and comprises a detachable handle 149 that terminates adjacent the inner end thereof into a casing 150 thermally associated with the wall of the vessel and housing a thermostatic control or switch element 151 that is selectively operated in accordance with the temperature of the contents of the vessel. The outer end of the handle 149 terminates in a connecting fixture 152 that is adapted to receive a cooperating connecting fixture 153 that is carried by the inner end of the detachable connector or cable 31, the outer end of the cable 31 being also provided with a connecting fixture 154 that cooperates with the receptacle 32 that is mounted upon the backsplasher, not shown, of the electric range. It will be understood that the inner end of the cable 31 may be readily connected and disconnected with respect to the outer end of the handle 149 of the pot 30 and that the outer end of the cable 31 may be readily connected and disconnected with respect to the receptacle 32. Finally, the receptacle 32 terminates two conductors 155 and 156 that are employed for control purposes, as explained more fully hereinafter. It will be understood that when the contents of the vessel or pot 30 reach a predetermined temperature, or a predetermined cooking condition prevails in the vessel, the thermostatic element 151 is operated to complete a bridge across the conductors 155 and 156 via the connecting fixtures 152, 153 and 154, and the receptacle 32. The temperature at which the thermal element 151 is operated may be adjusted manually by an associated adjusting screw indicated at 157.

The timer 40 comprises a manually operable control knob 158 readily accessible from the front of the backsplasher, not shown, from the front thereof that carries an associated index pointer 159 that cooperates with associated indicia 160. Thus manual rotation of the knob 158 effects the setting of a predetermined timing operation of the timer 40 as indicated by the pointer 159 cooperating with the indicia 160. Also, the timer 40 comprises an operating motor 161 of the synchronous type that is preferably a single phase "Telechron" motor. The operating motor 161 is provided with a circuit including a set of off-normal switch springs 162, one of the switch springs of the set 162 being connected to a conductor 163. The set of switch springs 162 is manually governed by the control knob 158, as indicated by the dotted line 162'; the arrangement being such that the set of switch springs 162 occupies its open position when the control knob 158 occupies its zero time or off position, and the set of switch springs 162 occupies its closed position when the control knob 158 occupies other than its off position. Thus when the control knob 158 is manually moved from its off position in order to set a predetermined timing operation of the timer 40 the set of off-normal switch springs 162 are closed connecting the conductor 163 to the operating motor 161; and subsequently when the operating motor 161 is operated the control knob 158 is returned back into its off position during the set predetermined time, whereupon the set of switch springs 162 is again operated into its open position. Also, the timer 40 comprises a set of switch springs 164, the individual switch springs of which are respectively connected to two conductors 165 and 166 that are employed for a control purpose more fully explained hereinafter. The set of switch springs 164 is operatively connected to the control knob 158, as indicated by the dotted line 164'; the arrangement being such that just as the control knob 158 is returned to its off position the set of switch springs 164 is operated from its open position into its closed position and thence back into its open position, whereby the conductors 165 and 166 are bridged together for a short time interval. Of course, the control knob 158 is operatively connected to the operating motor 161, as indicated by the dotted line 161'.

The relay 80 is of the slow-to-operate type and comprises an upper low resistance winding 169 and a lower high resistance winding 170. The relay 80 may be rendered slow-to-operate by the provision of a low resistance shunting winding or slug on the field structure thereof, and further comprises an armature, not shown, that operates three sets of contacts 171, 172 and 173, as explained more fully hereinafter. One terminal of the upper winding 169 and one terminal of the lower winding 170 are commonly connected to a conductor 174'; the other terminal of the upper winding 169 is connected to one of the contacts 173; the other terminal of the lower winding 170 is connected commonly to the conductor 155, to one of the contacts 173 and to one of the contacts 172; and the other contact 172 is connected to the conductor 156. One of the input terminals of the rectifier bridge 13 is directly connected to ground and the other input terminal thereof is directly connected to a conductor 174 that is commonly connected to one terminal of the section 11 of the heating unit 10 and to the switching contact 26 of the control switch 20. One of the output terminals of the rectifier bridge 13 is connected to the conductor 132 and the other output terminal thereof is connected to a conductor 175. Also, a smoothing condenser 176 bridges the output terminals of the rectifying bridge 13. One of the contacts 171 is connected to the conductor 174, and the other contact 171 is connected to a conductor 177.

The relay 90 is of the slow-to-operate type and comprises an upper low resistance winding 176 and a lower high resistance winding 177. The relay 90 may be rendered slow-to-operate by the provision of a low resistance shunting winding or slug on the field structure thereof, and further comprises an armature, not shown, that operates two sets of contacts 178 and 179, as explained more fully hereinafter. One terminal of the upper winding 176 and one terminal of the lower winding 177 are commonly connected to the conductor 174'; the other terminal of the upper winding 176 is connected to one of the contacts 179; the other terminal of the lower winding 177 is connected commonly to the conductor 166, to one of the contacts 179 and to one of the contacts 178; and the other contact 178 is connected to the conductor 165. One of the input terminals of the rectifier bridge 113 is directly connected to ground and the other input terminal thereof is directly connected to a codnuctor 180 that is commonly connected to one terminal of the section 111 of the heating unit 110 and to the switching contact 126 of the control switch 120. One of the output terminals of the rectifier bridge 113 is connected to the conductor 141 and the other output terminal thereof is connected to a conductor 181. Also, a smoothing condenser 182 bridges the output terminals of the rectifying bridge 113.

The key 50 comprises a normal middle position, a right-hand locking position selecting the first heating unit 10, and a left-hand locking position selecting the second heating unit 110. The right-hand section of the key 50 comprises seven individual springs termed first, etc., from the right, and the left-hand section of the key 50 comprises seven individual springs termed eighth, etc., from the right. In the key 50, the first spring terminates the conductor 136; the second spring terminates a conductor 183; the third spring terminates the conductor 131; the fourth spring terminates a conductor 184; the fifth spring terminates the conductor 175; the sixth spring terminates a conductor 185; the seventh and eighth springs commonly terminate the conductor 174'; the ninth spring terminates a conductor 186; the tenth spring terminates the conductor 181; the eleventh spring terminates the conductor 184; the twelfth spring terminates the conductor 140; the thirteenth spring terminates the conductor 183; and the fourteenth spring terminates the conductor 145.

The key 60 comprises a normal middle position, a right-hand locking position selecting the off motor 29 or the off motor 129 depending upon the position of the key 50, and a left-hand locking position selecting the low motor 28 or the low motor 128 depending upon the position of the key 50. The right-hand section of the key 60 comprises six individual springs termed first, etc., from the right, and the left-hand section of the key 60 comprises five individual springs termed seventh, etc., from the right. In the key 60, the first spring terminates the conductor 156; the second spring terminates the conductor 183; the third spring terminates the conductor 177; the fourth spring terminates the conductor 163; the fifth spring terminates the conductor 174; the sixth and seventh springs are jumpered together; the eighth spring terminates the conductor 163; the ninth spring terminates the conductor 177; the tenth spring terminates the conductor 156; and the eleventh spring terminates the conductor 184.

The key 70 comprises a normal middle position, an upper locking position selecting the low motor 28 or the low motor 128 depending upon the position of the key 50, and a lower locking position selecting the off motor 29 or the off motor 129 depending upon the position of the key 50. The upper section of the key 70 comprises two springs termed first and second from the top, and the lower section of the key 70 comprises two springs termed third and fourth from the top. In the key 70, the first spring terminates the conductor 184; the second and third springs are jumpered together and connected to the conductor 165; and the fourth spring is connected to the conductor 183.

The connection and arrangement of the control circuit incorporated in the electric range will best be understood from the following examples of the different operations thereof under the control of the thermal pot 30 and the timer 40 after a manual setting of one of the control switches 20 or 120 depending upon the selected heating unit 10 or 110. First assuming that the keys 50, 60 and 70 occupy their normal middle positions and that the control switches 20 and 120 occupy their off positions, all of the electric circuits are open. At this time the heating of the first surface unit 10 may be governed entirely manually by appropriate manipulation of the push buttons of the associated control switch 20; and, likewise, the heating of the second surface unit 110 may be governed entirely manually by appropriate manipulation of the push buttons of the associated control switch 120.

Now assuming that a control is to be exercised only by the thermal pot 30, the connector or cable 31 is operatively connected between the handle 149 of the pot 30 and the receptacle 32 provided in the backsplasher, not shown, of the electric range; and the food to be cooked is placed in the vessel or pot 30. At this time the user decides which of the heating units 10 or 110 that is to be employed and operates the select key 50 to the corresponding position. Similarly, the user decides whether the thermal pot 30 is to operate the control switch of the selected heating unit to its low position or to its off position when the pot 30 reaches the previously set cooking condition therein, and operates the select key 60 to the corresponding position.

As an example, assume that the user wishes to employ the first heating unit 10 for the purpose of heating the pot 30 and that the control switch 20 is to be operated from its high position to its low position when the contents of the pot 30 reach the previously set temperature, the select key 50 is operated to its right-hand locking position and the select key 60 is operated to its left-hand locking positiion. At this time the pot containing the food to be cooked is placed upon the first heating unit 10 and the high push button of the control switch 20 is operated, whereby the first heating unit 10 is heated in the manner previously explained at the high rate effecting heating of the supported pot 30 and its contents.

When the predetermined cooking temperature is reached in the pot 30, normally when the contents of the pot 30 begin to boil, the thermostatic element 151 is operated to bridge the conductors 155 and 156, thereby completing a circuit for energizing in multiple the upper and lower windings of the relay 80 and a series circuit for energizing the winding of the low motor 28. Specifically, when the control switch 20 is operated into its high position, an alternating voltage is applied to the conductor 174 at the switching contacts 26 in the control switch 20, whereby the input terminals of the rectifying bridge 13 are supplied with alternating current power causing a direct current voltage to appear between the output terminals thereof so that the pilot lamp 14 is directly illuminated via a circuit including the conductors 175 and 185 and the fifth and sixth springs of the key 50. At this time the positive output terminal of the rectifying bridge 13 is connected via the conductor 132, the winding of the low motor 28, the conductor 131, the third and fourth springs of the key 50, the conductor 184, and the tenth and eleventh springs of the key 60 to the conductor 156, the conductor 156 is bridged to the conductor 155 by the thermal element 151; the conductor 155 is connected directly via the lower winding 170 of the relay 80 to the conductor 174', and the conductor 155 is connected via the contacts 173 and the upper winding 169 of the relay 80 to the conductor 174'; and the conductor 174' is connected via the fifth, sixth and seventh springs of the key 50 and the conductor 175 to the negative terminal of the rectifying bridge 13. When this series circuit is thus completed, the low motor 28 operates to operate its armature 133, whereby the low push button of the control switch 20 is operated so that heating of the heating unit 10 continues at the low rate. Also, shortly after this series circuit is thus completed the relay 80 operates, it being of the slow-to-operate type. Upon operating, the relay 80 interrupts, at the contacts 173, the circuit for energizing the upper winding thereof; and completes, at the contacts 172, a bridge path in multiple to the thermal element 151. Accordingly, at this time a holding circuit is completed for energizing the lower winding 170 of the relay 80 in series with the winding of the low motor 28; which holding circuit includes the conductor 132, the winding of the low motor 28, the conductor 131, the third and fourth springs of the key 50, the conductor 184, the tenth and eleventh springs of the key 60, the conductor 156, the contacts 172, the lower winding 170 of the relay 80, the conductor 174', the fifth, sixth and seventh springs of the key 50 and the conductor 175. Thus at this time the thermostatic element 151 is disabled; and when the above-traced holding circuit is completed, the relay 80 is retained in its operated position. However, the low motor 28 releases its armature 33 due to the high series resistance of the lower winding 170 of the relay 80 in order to prevent the low motor 28 from interfering, in any way, with subsequent manual operation of the control switch 20.

Subsequently after the contents of the pot 30 have been cooked through a time interval agreeable to the user the off push button of the control switch 20 is operated, whereby the first heating unit 10 is disconnected from the associated source of current supply and power is removed from the conductor 174. Thus the pilot lamp 14 is extinguished, and the previously traced holding circuit for energizing the winding of the low motor 28 in series with the lower winding 170 of the relay 80 is interrupted in order to cause the relay 80 to restore, the low motor 28 having already released its armature 133, as previously explained. Upon restoring, the relay 80 interrupts, at the contacts 172, a further point in the holding circuit for energizing the lower winding thereof; and reprepares, at the contacts 173, the operating circuit for energizing in multiple the upper and lower windings 169 and 170 of the relay 80. At this time the control of the heating of the first heating unit 10 has been completed, and ordinarily the select keys 50 and 60 are returned to their normal middle positions.

As another example, assume that the user wishes to employ the first heating unit 10 for the purpose of heating the pot 30 and that the control switch 20 is to be operated from its high position to its off position when the contents of the pot 30 reach the previously set temperature, the select key 50 is operated to its righthand locking position and the select key 60 is operated to its right hand locking position. At this time the pot containing the food to be cooked is placed upon the first heating unit 10 and the high push button of the control switch 20 is operated, whereby the first heating unit 10 is heated in the manner previously explained at the high rate effecting heating of the supported pot 30 and its contents.

When a predetermined cooking temperature is reached in the pot 30, normally when the contents of the pot 30 begin to boil, the thermostatic element 151 is operated to bridge the conductors 155 and 156, thereby completing a circuit for energizing in multiple the upper and lower windings of the relay 80 and a series circuit for energizing the winding of the off motor 29. The operating circuit mentioned extends from the conductor 132 via the winding of the off motor 29, the conductor 136, the first and second springs of the key 50, the conductor 183, and the first and second springs of the key 60 to the conductor 156; the conductor 156 is bridged to the conductor 155 by the thermal element 151; the conductor 155 is connected directly via the lower winding 170 of the relay 80 to the conductor 174' and the conductor 155 is connected via the contacts 173 and the upper winding 169 of the relay 80 to the conductor 174'; and the conductor 174' is connected via the fifth, sixth and seventh springs of the key 50 to the conductor 175. When this series circuit is thus completed, the off motor 29 operates to operate its armature 137, whereby the off push button of the control switch 20 is operated so that heating of the heating unit 10 is discontinued. When the control switch 20 is thus operated into its off position the supply of power via the conductor 174 to the rectifying bridge 13 is interrupted so that the pilot lamp 14 is extinguished and the above-traced operating circuit is interrupted prior to operation of the relay 80. Thus the relay 80 is not operated, and the off motor 29 releases its armature 137 in order to prevent interference with subsequent manual operation of the control switch 20. At that time the control of the heating of the first heating unit 10 has been completed, and ordinarily the select keys 50 and 60 are returned to their normal middle positions.

Now assuming that a control is to be exercised only by the timer 40, it is unnecessary to connect the cable 31 between the outer end of the handle 149 of the pot 30 and the receptacle 32 supported on the front of the backsplasher, not shown, of the electric range. In fact, it is not even necessary to employ the thermal pot 30 in the cooking operation as any vessel may be used to contain the food that is to be cooked. At this time the user decides what time interval the food contained in the vessel is to be cooked and manually operates the knob 158 in accordance with the time noted, the pointer 159 indicating the time selected due to its cooperation with the indicia 160. Next, the user determines which of the heating units 10 or 110 that is to be employed and operates the select key 50 to the corresponding position. Similarly, the user decides whether the timer 40 is to operate the control switch of the selected heating unit to its low position or to its off position when the timer 40 operates through the preset time interval, and operates the key 70 to the corresponding position.

As an example, assume that the user wishes to employ the first heating unit 10 for the purpose of heating the vessel and that the control switch 20 is to be operated from its high position to its low position at the expiration of the timing interval by the timer 40, the select key 50 is operated to its right-hand locking position and the select key 70 is operated to its upper locking position. At this time the vessel containing the food to be cooked is placed upon the first heating unit 10 and the high push button of the control switch 20 is operated, whereby the first heating unit 10 is heated in the manner previously explained at the high rate effecting heating of the supported vessel and its contents.

When the control switch 20 is thus operated into its high position, power is supplied to the rectifying bridge 13 effecting illumination of the pilot lamp 14, as previously explained. Also, power is supplied directly via the conductor 174, the fifth, sixth, seventh and eighth contacts of the select key 60, the conductor 163, and the off-normal switch springs 162 to the operating motor 161 of the timer 40, whereby the timer 40 initiates the previously set timing operation, the operating motor 161 operating at the synchronous timing rate, as previously explained. Upon the expiration of the previously set timing operation of the timer 40 the set of switch springs 162 is operated back into its open position interrupting the circuit for the operating motor 161 in order to arrest further operation of the timer 40. Also at this time the control knob 158 of the timer 40 has been operated back into its zero time or normal position and the set of switch springs 164 is operated from its open position into its closed position and thence back into its open position, the set of switch springs 164 being retained in its closed position for a time interval sufficiently long to permit slow operation of relay 90, as explained more fully below.

More particularly when the set of switch springs 164 is operated into its closed position, there is completed a circuit for energizing in multiple the upper and lower windings of the relay 90 and a series circuit for energizing the winding of the low motor 28. This circuit includes the conductor 132, the winding of the low motor 28, the conductor 131, the third and fourth springs of the key 50, the conductor 184, the first and second springs of the key 70, the conductor 165, the set of switch springs 164, and the conductor 166; the conductor 166 is connected directly via the lower winding 177 of the relay 90 to the conductor 174', and the conductor 166 is connected via the contacts 179 and the upper winding 176 of the relay 90 to the conductor 174'; and further, the conductor 174' is connected via the fifth, sixth and seventh springs of the key 50 to the conductor 175. When this series circuit is thus completed the low motor 28 operates to operate its armature 133, whereby the low push button of the control switch 20 is operated so that heating of the heating unit 10 continues at the low rate. Also, shortly after this series circuit is thus completed the relay 90 operates, it being of the slow-to-operate type. Upon operating, the relay 90 interrupts, at the contacts 179, the circuit for energizing the upper winding thereof; and completes, at the contacts 178, a bridge path in multiple to the set of switch springs 164 of the timer 40. Accordingly, at this time a holding circuit is completed for energizing the lower winding 177 of the relay 90 in series with the winding of the low motor 28; which holding circuit includes the conductor 132, the winding of the low motor 28, the conductor 131, the third and fourth springs of the key 50, the conductor 184, the first and second springs of the key 70, the conductor 165, the contacts 178, the lower winding 177 of the relay 90, the conductor 174', the fifth, sixth and seventh springs of the key 50, and the conductor 175. Thus at this time the set of switch springs 164 of the timer 40 is disabled; and the subsequent operation of the set of switch springs 164 into its open position is without effect; and when the above-traced holding circuit is completed the relay 90 is retained in its operated position. However, the low motor 28 releases its armature 133 due to the high series resistance of the lower winding 177 of the relay 90 in order to prevent the low motor 28 from interfering, in any way, with subsequent manual operation of the control switch 20.

Subsequently, after the contents of the vessel have been cooked through a time interval agreeable to the user the off push button of the control switch 20 is operated, whereby the first heating unit 10 is disconnected from the associated source of current supply and power is removed from the conductor 174. Thus the pilot lamp 14 is extinguished, and the previously traced holding circuit for energizing the winding of the low motor 28 in series with the lower winding 177 of the relay 90 is interrupted in order to cause the relay 90 to restore, the low motor 28 having already released its armature 133, as previously explained. Upon restoring, the relay 90 interrupts, at the contacts 178, a further point in the holding circuit for energizing the lower winding thereof; and reprepares, at the contacts 179, the operating circuit for energizing in multiple the upper and lower windings 176 and 177 of the relay 90. At this time the control of the heating of the first heating unit 10 has been completed, and ordinarily the select keys 50 and 70 are returned to their normal middle positions.

In passing it is noted that in the timer 40 a gong 190 may be provided that is operatively connected to the knob 156, as indicated by the dotted line 190'; the arrangement being such that when the knob 158 is returned back into its zero time or normal position that the gong 190 is sounded. This arrangement gives the user of the electric range an audible alarm or signal indicating that the timer 40 has completed its previously set timing operation.

As another example, assume that the user wishes to employ the first heating unit 10 for the purpose of heating the vessel and that the control switch 20 is to be operated from its high position to its off position at the expiration of the previously set timing operation of the timer 40, the select key 50 is operated to its right-hand locking position and the select key 70 is operated to its lower locking position. At this time the vessel containing the food to be cooked is placed upon the first heating unit 10, and the high push button of the control switch 20 is operated, whereby the first heating unit 10 is heated in the manner previously explained at the high rate effecting heating of the supported vessel and its contents.

When the control switch 20 is thus operated into its high position, power is supplied to the rectifying bridge 13 effecting illumination of the pilot lamp 14, and the circuit of the operating motor 161 is completed initiating operation of the timer 40, as previously explained. Upon the expiration of the previously set timing operation of the timer 40 the set of switch springs 162 is operated back into its open position interrupting the circuit for the operating motor 161 in order to arrest further operation of the timer 40. Also, at this time the control knob 158 of the timer 40 has been operated back into its zero time or normal position and the gong 190 is sounded in order to inform the user that the timer 40 has completed its timing operation, as previously explained. Also, at this time the set of switch springs 164 is operated from its open position into its closed position and thence back into its open position, whereby there is completed a circuit for energizing in multiple the upper and lower windings of the relay 90 and a series circuit for energizing the winding of the off motor 29. The operating circuit mentioned extends from the conductor 132 via the windings of the off motor 29, the conductor 136, the first and second springs of the key 50, the conductor 183, and the third and fourth springs of the key 70 to the conductor 165; the conductor 165 is bridged to the conductor 166 by the set of switch springs 164; the conductor 166 is connected directly via the lower winding 177 of the relay 90 to the conductor 174', and the conductor 166 is connected via the contacts 179 and the upper winding 176 of the relay 90 to the conductor 174'; and the conductor 174' is connected via the fifth, sixth and seventh springs of the key 50 to the conductor 175. When this series circuit is thus completed, the off motor 29 operates to operate its armature 137, whereby the off push button of the control switch 20 is operated so that heating of the heating unit 10 is discontinued. When the control switch 20 is thus operated to its off position the supply of power via the conductor 174 to the rectifying bridge 13 is interrupted so that the pilot lamp 14 is extinguished, and the above traced operating circuit is intrrupted prior to operation of the relay 90. Thus the relay 90 is not operated, and the off motor 29 releases its armature 137 in order to prevent interference with subsequent manual operation of the control switch 20. At this time the control of the heating of the first heating unit 10 has been completed, and ordinarily the select keys 50 and 70 are returned to their normal middle positions.

Now assuming that controls are to be exercised jointly by the thermal pot 30 and by the timer 40, the pot 30 is connected up as previously explained, and the food to be cooked is placed in the pot 30. Again the user decides which of the heating units 10 or 110 that is to be employed and operates the select key 50 to the corresponding position, and again it is assumed that the key 50 is operated to its righthand locking position to select the first heating unit 10. Then the user operates the select key 60 to its lefthand locking position in order to give the thermal pot 30 control of the operation of the control switch 20 from its high position into its low position. Then the user operates the select key 70 into its lower locking position in order to give the timer 40 control of the operation of the control switch 20 from its low position into its off position. The user then sets the desired operating time of the timer 40 by appropriate manipulation of the knob 158, and places the pot 30 and its contents upon the first heating unit 10. Finally, the user operates the high push button of the control switch 20, whereby the first heating unit 10 is heated in the manner previously explained at the high rate effecting heating of the supported pot 30 and its contents.

When the pot 30 and its contents reach the predetermined cooking temperature, the thermal element 151 is operated closing the previously traced operating circuit for energizing in multiple the upper and lower windings of the relay 80 and the winding of the low motor 28, whereby the low motor 28 operates its armature 133 in order to operate the control switch 20 from its high position into its low position so that heating of the pot 30 and its contents continues at the low rate. Shortly thereafter the relay 80 operates interrupting the circuit for energizing the upper winding thereof and completing the holding circuit independent of the thermal element 151 for energizing the lower winding of the relay 80 in series with the winding of the low motor 28, as previously explained. The relay 80 is retained in its operated position and the low motor 28 releases its armature 133 so as to prevent interference with subsequent operation of the control switch 20 by the off motor 29.

Also, upon operating, the relay 80 completes, at the contacts 171, an alternative circuit for the operating motor 161 of the timer 40 that includes the conductors 174 and 177, the eighth and ninth springs of the key 60 and the conductor 163, whereby operation of the operating motor 161, and consequently the timer 40, is initiated. Recapitulating, since the select key 60 occupies its left-hand locking position, the conductor 174 is not immediately connected to the conductor 163, whereby the connection mentioned is not completed until operation of the relay 80 is effected. Thus it will be understood that operation of the timer 40 is not initiated until the pot 30 and its contents reach the predetermined cooking temperature, regardless of the amount of time that this might consume. Thus operation of the timer 40 is initiated only when the pot 30 has reached its predetermined cooking temperature.

Heating of the pot 30 and its contents continues at the low rate until the expiration of the preset time interval, whereby the timer 40 operates the set of switch springs 164 in order to complete the circuit for energizing in multiple the upper and lower windings of the relay 90 and the series circuit for energizing the winding of the off motor 29. The off motor 29 then operates its armature 137, whereby the control switch 20 is operated from its low position into its off position so that the supply of power to the rectifying bridge 13 is interrupted. At this time the pilot lamp 14 is extinguished, the holding circuit for retaining operated the relay 80 is interrupted and the circuit for energizing in multiple the upper and lower windings of the relay 90 is interrupted. Thus the relay 80 restores and the relay 90 does not operate as it is of the slow-to-operate type. The circuits for energizing the windings of the low motor 28 and the off motor 29 are interrupted so that there is no interference by the motors 28 and 29 with subsequent manual operation of the control switch 20. At this time the control of the heating of the first heating unit 10 has been completed, and ordinarily the select keys 50, 60 and 70 are returned to their normal middle positions.

In the foregoing examples of the various operations of the control circuit it was always assumed that the user selected the first heating unit 10 to be controlled; however, it will be understood that the second heating unit 110 may be selected for control in a substantially identical manner by operation of the select key 50 to its left-hand locking position. The control that is exercised upon the second heating unit 110 depends upon the selective operations of the select keys 60 and 70, whereby the elements of the control circuit are operative in a manner substantially identical to that previously described to effect the required control of the second heating unit 110. In the interest of brevity the details of the operations of the control circuit to carry out the individual controls of the heating of the second heating unit 110 will not be set forth, as these operations are substantially the same as those described in conjunction with the first heating unit 10. Thus it will be understood that the thermal pot 30 may be supported upon the second heating unit 110 and employed to operate either the low motor 128 or the off motor 129 depending upon the position of the select key 60, as previously explained. Likewise, the timer 40 may be employed to operate either the low motor 128 or the off motor 129 depending upon the position of the select key 70, as previously explained. Finally, the low motor 128 and the off motor 129 may be sequentially controlled respectively by the thermal pot 30 and by the timer 40 by operating the select key 60 into its left-hand locking position and by operating the select key 70 into its lower locking position. In this arrangement, when the select key 50 occupies its left-hand locking position selecting the second heating unit 110 to be controlled, the control switch 120 controls the supply of power via the conductor 180 to the rectifying bridge 113 just as the control switch 20 controls the supply of power via the conductor 174 to the rectifying bridge 13. Also, in this case the power for operating the relays 80 and 90 and the motors 128 and 129 is supplied from the rectifying bridge 113 instead of the rectifying bridge 13. Finally in this case the pilot lamp 114 is illuminated when power is supplied to the rectifying bridge 113.

In the foregoing illustration the thermostatic pot 30 or the timer 40 or both the thermostatic pot 30 and the timer 40 were selectively employed for the purpose of controlling the motors 28 and 29 associated with the control switch 20 or the motors 128 and 129 associated with the control switch 120. While the motors 28 and 128 are operatively associated with the low push buttons of the control switches 20 and 120, and while the motors 29 and 129 are operatively associated with the off push buttons of the control switches 20 and 120, it is contemplated that the set of motors in any control switch may be operatively associated with any desired two of the push buttons incorporated therein. By way of illustration in the control switch 20 the two motors 28 and 29 may be operatively associated with the respective second and warm push buttons incorporated therein, whereby the corresponding switching positions of the control switch 20 are obtained incident to the respective operations of the motors 28 and 29. A wide variety of arrangements may be readily obtained by appropriate association of the motors 28 and 29 with the push rods of the desired push buttons incorporated in the control switch 20 as will be readily understood from a mechanical standpoint upon examination of the physical construction and arrangement of the push button control switch 20, as disclosed in the previously mentioned McDowell application.

In view of the foregoing it is apparent that there has been provided an improved and exceedingly flexible heating control circuit for a heating appliance, such, for example, as an electric range.

While there has been described what is at present considered to be the preferred embodiment of the invention, it will be understood that various modifications may be made therein, and it is intended to cover in the appended claims all such modifications as fall within the true spirit and scope of invention.

What is claimed is:

1. In an appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising a first electro-responsive motor operative to operate said switch into a first of its positions, a first operating circuit for said first motor, a second electro-responsive motor operative to operate said switch into a second of its positions, a second operating circuit for said second motor, means for selecting either one of said operating circuits, means responsive to operation of said switch into a third of its positions for preparing the selected one of said operating circuits, a selectively operative device, and means responsive to operation of said device for completing the selected and prepared one of said operating circuits.

2. In a cooking appliance including a heating unit adapted to support a cooking vessel, a source of current supply, and a unitary manually operable control switch selectively operative from an off position into respective high and low positions to complete respective high and low electrical heating connections between said heating unit and said source so as to effect heating of said heating unit at corresponding high and low heating rates; the combination comprising a first electro-responsive motor operative to operate said switch into its low position, a first operating circuit for said first motor, a second electro-responsive motor operative to operate said switch into its off position, a second operating circuit for said second motor, means for selecting either one of said operating circuits, means responsive to operation of said switch into its high position for preparing the selected one of said operating circuits, a device operated in response to a predetermined cooking temperature of a wall of a cooking vessel supported by said heating unit, and means responsive to operation of said device for completing the selected and prepared one of said operating circuits.

3. In an appliance including a heating unit, a source of current supply, and a unitary manually operable control switch of the push button type provided with a plurality of individual push buttons selectively operative in order to operate said switch into a corresponding plurality of different positions to establish a corresponding plurality of different electrical heating connections between said heating unit and said source so as as to effect heating of said heating unit at a corresponding plurality of different heating rates; the combination comprising a first electro-responsive motor operatively associated with a first of said push buttons and operative to operate said first push button, a first operating circuit for said first motor, a second electro-responsive motor operatively associated with a second of said push buttons and operative to operate said second push button, a second operating circuit for said second motor, means for selecting either one of said operating circuits, means responsive to operation of a third of said push buttons for preparing the selected one of said operating circuits, a selectively operative device, and means responsive to operation of said device for completing the selected and prepared one of said operating circuits.

4. In an appliance including a heating unit, a source of current supply, and a unitary manually operable control switch selectively operative into a plurality of different positions in order to establish a corresponding plurality of different electrical heating connectitons between said heating unit and said source so as to effect heating of said heating unit at corresponding different heating rates; the combination comprising a first electro-responsive motor operative to operate said switch into a first of its positions, a first operating circuit for said first motor, a second electro-responsive motor operative to operate said switch into a second of its positions, a second operating circuit for said second motor, means for selecting either one of said operating circuits, means responsive to operation of said switch into a third of its positions for preparing the selected one of said operating circuits, a device of the thermal operated type governed by said heating unit, and means responsive to operation of said device for completing the selected and prepared one of said operating circuits.

5. In an appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising a first electro-responsive motor operative to operate said switch into a first of its positions, a first operating circuit for said first motor, a second electro-responsive motor operative to operate said switch into a second of its positions, a second operating circuit for said second motor, means for selecting either one of said operating circuits, means responsive to operation of said switch into a third of its positions for preparing the selected one of said operating circuits, a device of the time operated type governed by clock mechanism, and means responsive to operation of said device for completing the selected and prepared one of said operating circuits.

6. In an appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising a first electro-responsive motor operative to operate said switch into a first of its positions, a first operating circuit for said first motor, a second electro-responsive motor operative to operate said switch into a second of its positions, a second operating circuit for said second motor, means for selecting either one of said operative circuits, means responsive to operation of said switch into a third of its positions for preparing the selected one of said operating circuits, a first device of the thermal operated type governed by said heating unit, a second device of the time operated type governed by clock mechanism, means for selecting either one of said devices, and means responsive to operation of the selected one of said devices for completing the selected and prepared one of said operating circuits.

7. In an appliance including a heating unit, a source of current supply, and a unitary manually operable control switch selectively operative from an off position into respective high and low positions to complete respective high and low electrical heating connections between said heating unit and said source so as to effect heating of said heating unit at corresponding high and low heating rates; the combination comprising a first electro-responsive motor operative to operate said switch into its low position, a first operating circuit for said first motor, a second electro-responsive motor operative to operate said switch into its off position, a second operating circuit for said second motor, a device of the thermal operated type governed by said heating unit, a timer, means responsive to operation of said switch into its high position for preparing said first operating circuit, means responsive to operation of said device for completing said prepared first operating circuit and for preparing said second operating circuit and for initiating a timing operation of said timer, and means responsive to completion of a predetermined timing operation of said timer for completing said prepared second operating circuit.

8. In an appliance including first and second heating units, a source of current supply, a first unitary manually operable control switch individually associated with said first heating unit, and a second unitary manually operable control switch individually associated with said second heating unit, each of said switches being selectively operative into a plurality of different positions in order to establish a corresponding plurality of different electrical heating connections between the individually associated one of said heating units and said source so as to effect heating of the individually associated one of said heating units at corresponding different heating rates; the combination comprising a first electro-responsive motor operative to operate said first switch into a given one of its positions, a first operating circuit for said first motor, a second electro-responsive motor operative to operate said second switch into a given one of its positions, a second operating circuit for said second motor, means for selecting either one of said operating circuits, means responsive to operation of said first switch into a predetermined one of its positions for preparing said first operating circuit, means responsive to operation of said second switch into a predetermined one of its positions for preparing said second operating circuit, a selectively operative device, and means responsive to operation of said device for completing the selected and prepared one of said operating circuits.

9. In an appliance including first and second heating units, a source of current supply, a first unitary manually operable control switch individually associated with said first heating unit, and a second unitary manually operable control switch individually associated with said second heating unit, each of said switches being selectively operative into a plurality of different positions in order to establish a corresponding plurality of different electrical heating connections between the individually associated one of said heating units and said source so as to effect heating of the individually associated one of said heating units at corresponding different heating rates; the combination comprising a first electro-responsive motor operative to operate said first switch into a given one of its positions, a first operating circuit for said first motor, a second electro-responsive motor operative to operate said second switch into a given one of its positions, a second operating circuit for said second motor, means for selecting either one of said operating circuits, means responsive to operation of said first switch into a predetermined one of its positions for preparing said first operating circuit, means responsive to operation of said second switch into a predetermined one of its positions for preparing said second operating circuit, a device of the thermal operated type adapted to be associated with either one of said heating units and governed by the associated one of said heating units, and means responsive to operation of said device for completing the selected and prepared one of said operating circuits.

10. In an appliance including first and second heating units, a source of current supply, a first unitary manually operable control switch individually associated with said first heating unit, and a second unitary manually operable control switch individually associated with said second heating unit, each of said switches being selectively operative into a plurality of different positions in order to establish a corresponding plurality of different electrical heating connections between the individually associated one of said heating units and said source so as to effect heating of the individually associated one of said heating units at corresponding different heating rates; the combination comprising a first electro-responsive motor operative to operate said first switch into a given one of its positions, a first operating circuit for said first motor, a second electro-responsive motor operative to operate said second switch into a given one of its positions, a second operating circuit for said second motor, means for selecting either one of said operating circuits, means responsive to operation of said first switch into a predetermined one of its positions for preparing said first operating circuit, means responsive to operation of said second switch into a predetermined one of its positions for preparing said second operating circuit, a device of the time operated type governed by clock mechanism, and means responsive to operation of said device for completing the selected and prepared one of said operating circuits.

11. In an appliance including first and second heating units, a source of current supply, a first unitary manually operable control switch individually associated with said first heating unit, and a second unitary manually operable control switch individually asociated with said second heating unit, each of said switches being selectively operative into a plurality of different positions in order to establish a corresponding plurality of different electrical heating connections between the individually associated one of said heating units and said source so as to effect heating of the individually associated one of said heating units at corresponding different heating rates; first and second electro-responsive motors operatively associated with said first switch and respectively operative to operate said first switch into first and second of its positions, a first and second operating circuits for said first and second motors respectively, means responsive to operation of said first switch into a third of its positions for preparing said first and second operating circuits, third and fourth electro-responsive motors operatively associated with said second switch and respectively operative to operate said second switch into first and second of its position, third and fourth operating circuits for said third and fourth motors respectively, means responsive to operation of said second switch into a third of its positions for preparing said third and fourth operating circuits, means for selecting any one of said operating circuits, a selectively operative device, and means responsive to operation of said device for completing the selected and prepared one of said operating circuits.

12. In an appliance including a heating unit, a source of current supply, and a unitary manually operable control switch selectively operative from an off position into respective high and low positions to complete respective high and low electrical heating connections between said heating unit and said source so as to effect heating of said heating unit at corresponding high and low heating rates; a thermal device, a timer, a control device, a first electro-responsive motor operative to operate said switch from its high position into its low position, a first operating circuit for said first motor, a second electro-responsive motor operative to operate said switch from its low position into its off position, a second operating circuit for said second motor, means governed by said thermal device in response to a predetermined heating effect produced by said heating unit following manual operation of said switch from its off position into its high position for completing said first operating circuit and for operating said control device, means responsive to operation of said control device for initiating a timing operation of said timer, and means governed by said timer in response to the completion of a predetermined timing operation thereof for completing said second operating circuit.

13. In an appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising a first electro-responsive motor operative to operate said switch into a first of its positions, a first operating circuit for said first motor, a second electro-responsive motor operative to operate said switch into a second of its positions, a second operating circuit for said second motor, means for selecting either one of said operating circuits, means responsive to operation of said switch into a third of its positions for preparing the selected one of said operating circuits, a selectively operative device, slow-acting mechanism, means responsive to operation of said device for completing the selected and prepared one of said operating circuits in order to operate the associated one of said motors and for initiating operation of said mechanism, and means responsive to complete operation of said mechanism for interrupting the completed one of said operating circuits in order to restore the associated one of said motors.

14. In an appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising a first electro-responsive motor operative to operate said switch into a first of its positions, a first operating circuit for said first motor, a second electro-responsive motor operative to operate said switch into a second of its positions, a second operating circuit for said second motor, means for selecting either one of said operating circuits, means responsive to operation of said switch into a third of its positions for preparing the selected one of said operating circuits, a first device of the thermal operated type governed by said heating unit, a second device of the time operated type governed by clock mechanism, means for selecting either one of said devices, slow-acting mechanism, means responsive to operation of the selected one of said devices for completing the selected and prepared one of said operating circuits in order to operate the associated one of said motors and for initiating operation of said mechanism, and means responsive to complete operation of said mechanism for interrupting the completed one of said operating circuits in order to restore the associated one of said motors.

15. In an appliance including a heating unit, a source of current supply, and a unitary manually operable control switch selectively operative from an off position into respective high and low positions to complete respective high and low electrical heating connections between said heating unit and said source so as to effect heating of said heating unit at corresponding high and low heating rates; the combination comprising a first electro-responsive motor operative to operate said switch into its low position, a first operating circuit for said first motor, a second electro-responsive motor operative to operate said switch into its off position, a second operating circuit for said second motor, means responsive to operation of said switch into its high position for preparing said first operating circuits, a device of the thermal operated type governed by said heating unit, a timer, slow-acting mechanism, means responsive to operation of said device for completing said first operating circuit in order to operate said first motor and for initiating operation of said mechanism and for initiating a timing operation of said timer, means responsive to complete operation of said mechanism for interrupting said first operating circuit in order to restore said first motor, means responsive to completion of a predetermined timing operation of said timer for completing said second operating circuit in order to operate said second motor, and means responsive to operation of said switch to its off position for interrupting said second operating circuit in order to restore said second motor.

16. In an appliance including a heating unit, a source of A. C. supply, and a unitary manually operable control switch selectively operative from an off position into respective high and low positions to complete respective high and low electrical heating connections between said heating unit and said source in order to effect heating of said heating unit at corresponding high and low heating rates; the combination comprising a rectifier having input and output terminals, means responsive to operation of said switch out of its off position for connecting said source to the input terminals of said rectifier and responsive to operation of said switch into its off position for disconnecting said source from the input terminals of said rectifier, an electro-responsive motor having a winding and operative to operate said switch into a given one of its positions, a selectively operative device, and means responsive to operation of said device for connecting the winding of said motor to the output terminals of said rectifier, the winding of said motor being energized when it is connected to the output terminals of said rectifier only when said source is connected to the input terminals of said rectifier, said motor being operated in response to energization of the winding thereof.

WALTER R. McDOWELL.

REFERENCES CITED

The following references are of record in the file of this patent:

UNITED STATES PATENTS

| Number | Name | Date |
| --- | --- | --- |
| 1,682,337 | Hewitt | Aug. 28, 1928 |
| 1,702,480 | Newsom | Feb. 19, 1929 |
| 2,222,124 | Sherman | Nov. 19, 1940 |
| 2,327,632 | Frazier | Aug. 24, 1943 |
| 2,363,326 | Hodgkins | Nov. 21, 1944 |
| 2,385,433 | Weber | Sept. 25, 1945 |
| 2,385,434 | Weber | Sept. 25, 1945 |
| 2,409,414 | Bletz | Oct. 15, 1946 |
| 2,421,452 | Cody | June 3, 1947 |
| 2,431,904 | Andrews | Dec. 2, 1947 |
| 2,530,643 | Berg et al. | Nov. 21, 1950 |
| 2,550,579 | McDowell | Apr. 24, 1951 |